Sept. 7, 1943.  S. SCHNELL  2,328,685
BRAKING SYSTEM
Filed March 19, 1942  4 Sheets-Sheet 3

INVENTOR
STEVE SCHNELL
BY
ATTORNEY

Patented Sept. 7, 1943

2,328,685

UNITED STATES PATENT OFFICE 2,328,685

BRAKING SYSTEM

Steve Schnell, Kirkwood, Mo., assignor to Wagner Electric Corporation, St. Louis, Mo., a corporation of Delaware Application March 19, 1942, Serial No. 435,274

20 Claims. (Cl. 188—152)

My invention relates to brake actuating systems and more particularly to a hydraulic actuating system embodying two master cylinders operable by a single member.

One of the objects of my invention is to produce a hydraulic actuating system in which two simultaneously operated master cylinders are so employed that a large displacement of liquid can be obtained during the initial application of liquid pressure to the actuated device (brake) as a result of both master cylinders displacing liquid under pressure to the device and a smaller displacement of liquid during the later application of liquid pressure as a result of only one master cylinder displacing liquid under pressure to the device.

Another object of my invention is to produce a hydraulic actuating system in which two simultaneously actuated master cylinders are so employed that both the service brakes and a separate emergency brake can be actuated but the latter only in the event of total or partial failure of the actuation of the service brakes.

Still another and more specific object of my invention is to so construct and embody the master cylinders in an actuating system for both service and emergency brakes that both master cylinders will be employed to actuate the service brakes and only one master cylinder will be employed to actuate the emergency brake.

Yet another object of my invention is to so construct a master cylinder device for use in a dual master cylinder braking system that it will, during the initial portion of the stroke of its piston, develop pressure up to a predetermined value, during the intermediate portion of its piston stroke maintain the pressure previously developed at the predetermined value, and during the last portion of its piston stroke develop pressure higher than said predetermined value.

Other objects of my invention will become apparent from the following description of my invention taken in connection with the accompanying drawings in which.

Figure 1:
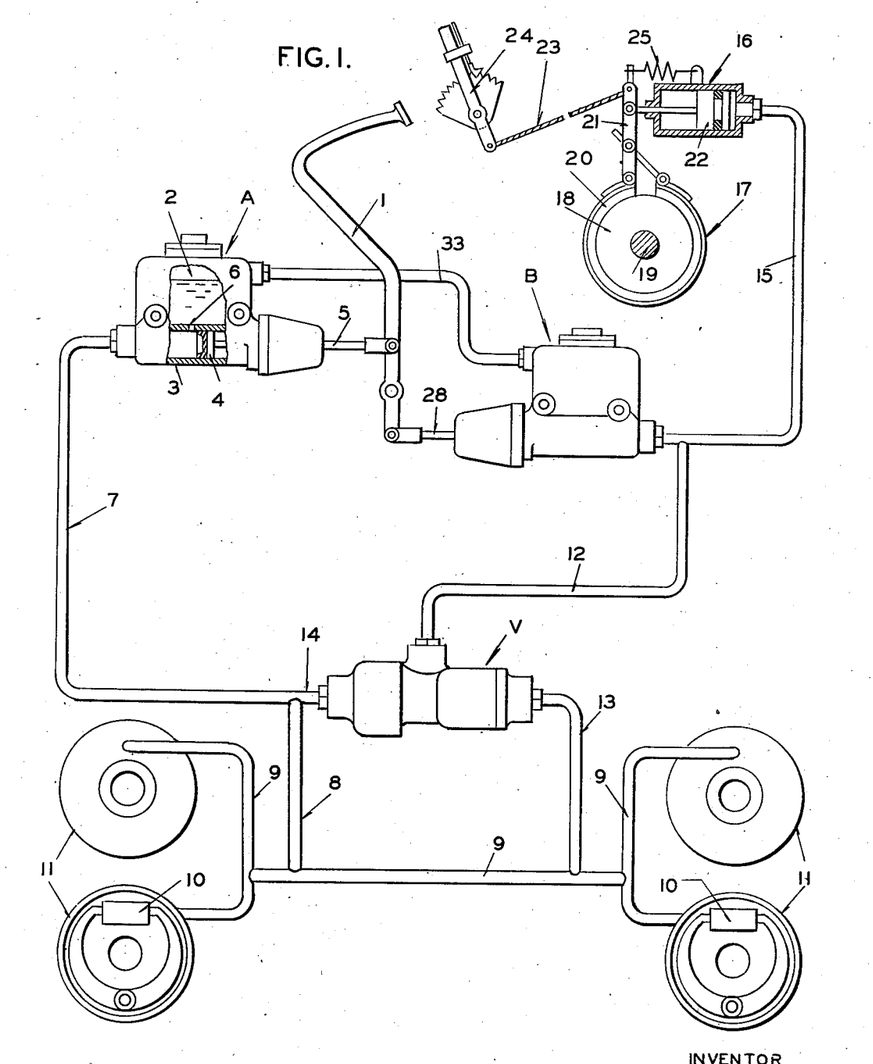
Figure 1 is a schematic view of a braking system embodying my invention, parts being shown in section.
Figures 2, 3:
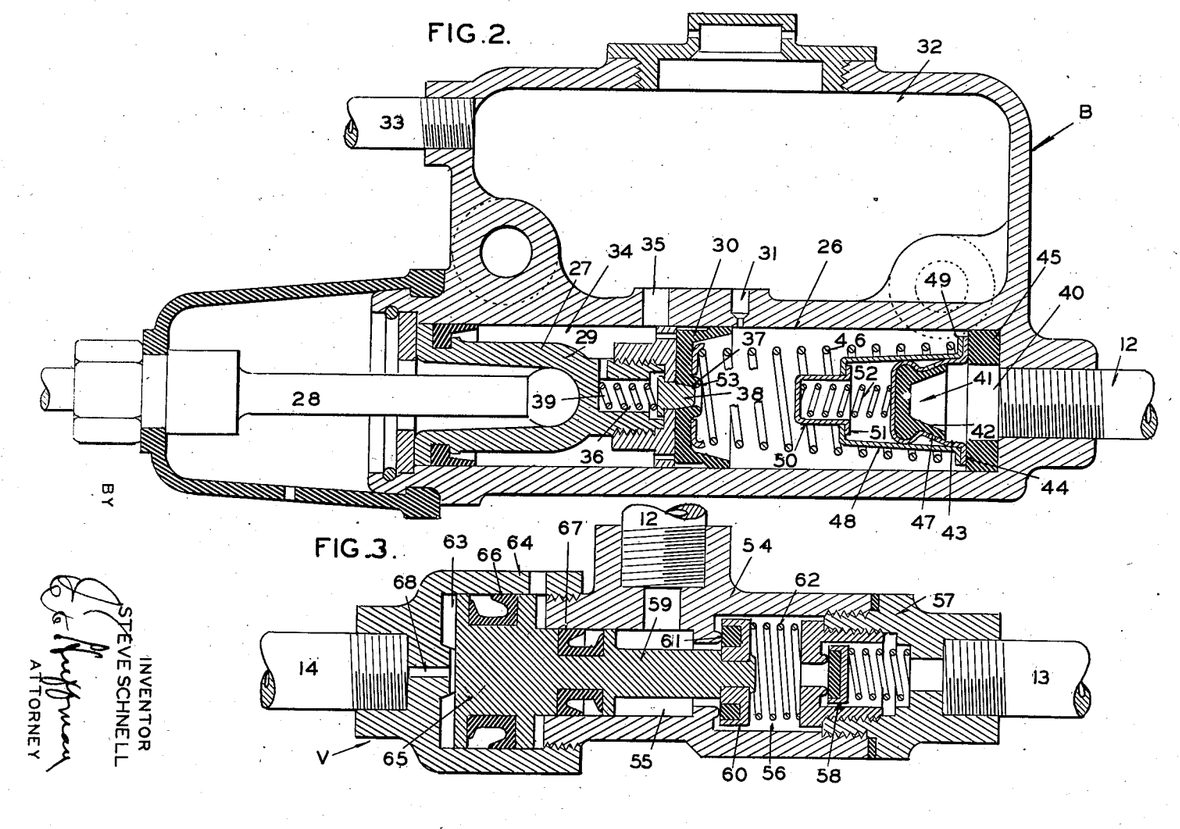
Figure 2 is a sectional view of one of the master cylinders employed in the system.
Figure 3 is a sectional view of the valve mechanism employed in the system.

Referring first to Figures 1, 2, and 3, and particularly to Figure 1, the braking system disclosed comprises two master cylinders A and B adapted to be simultaneously actuated by a common pedal 1. The master cylinder A is of standard construction comprising a reservoir 2, a cylinder 3, and a piston 4, said piston being connected by a piston rod 5 to the pedal 1 above its pivot. When the piston is in retracted position, the compensating porthole 6 is uncovered in order to permit free communication in both directions between the reservoir and cylinder 3. The forward end of cylinder 3 is connected by conduits 7 and 8, and various branch conduits 9 with the actuating fluid motors 10 of the service brake assemblies 11 to be actuated.

The master cylinder B is of special construction and the details thereof are shown in Figure 2. The outlet of this master cylinder is connected by a conduit 12 to a special control valve V shown in detail in Figure 3, whereby communication between conduit 12 and a conduit 13 leading to the fluid motors 10 is controlled. Certain parts of the valve V, as will become apparent later, are adapted to be controlled by pressure from the master cylinder A which is connected thereto by a branch conduit 14 communicating with conduit 7.

The outlet of the master cylinder B also communicates, by means of a branch conduit 15, with a fluid motor 16 which is adapted to actuate an emergency or parking brake 17 entirely separate from the brakes 11. This emergency or parking brake may, for example, be associated with the propeller shaft 19 of the vehicle and comprises a drum 18 secured to the propeller shaft and a brake band 20 for cooperation with the drum. A leverage mechanism 21 is employed to operate the brake band and said leverage mechanism is connected to be actuated by the piston 22 of the fluid motor 16. The leverage mechanism is also adapted to be actuated manually in order that it can be used as a parking brake, the manual mechanism comprising a cable 23 and a hand lever 24. A spring 25 is employed to retract the brake band from the drum when the brake band is released.

The master cylinder B, as shown in Figure 2, comprises a cylinder 26 in which is reciprocable a piston 27, said piston being actuated by a piston rod 28 which is connected to pedal 1 below its pivot a distance equal to that of the distance between the pivot and the connection of the piston rod 5 of master cylinder A. Thus it is seen that by this connecting arrangement between the pedal and the pistons of the two master cylinders, both pistons will be moved equal distances whenever the pedal is actuated. The head 29 of piston 27 is provided with a packing cup 30 and when the piston is in its retracted position, this packing cup uncovers a compensating port 31 for permitting free communication in both directions between cylinder 26 and reservoir 32. This reservoir is adapted to communicate with reservoir 2 of master cylinder A by means of a conduit 33. The purpose of this communication will become apparent later.

The piston 27 is of the spool type in order to provide an annular chamber 34 at the rear of the head 29 and this chamber is in constant communication with the reservoir through an opening 35. The head of the piston is formed with a passage 36 and the packing cup 30 is provided with a central passage 37, both of which establish communication between chamber 34 and the portion of the cylinder ahead of the piston. These passages are controlled by a valve element 38 which is biased to a closed position by a spring 39 of predetermined strength. The valve element is in the form of a tapered plug and closes the passages by engagement with the wall of passage 37 in the packing cup, said wall being tapered in order to be snugly engaged by the valve element. Fluid can flow through passages 36 and 37 from the portion of the cylinder ahead of the packing cup to chamber 34 only when the pressure in the cylinder portion is of such value as to cause the valve element to be unseated from the wall of the opening of the packing cup as a result of rearward movement against the action of spring 39.

The forward end of cylinder 26 is provided with an outlet 40 which communicates with conduit 12 and branch conduit 15. Associated with the outlet is a two-way valve mechanism 41 of known construction for maintaining a slight positive pressure on the fluid in the conduits connected to the outlet of the master cylinder when the piston is retracted. This valve mechanism comprises a rubber valve element 42 fitted within a cup-shaped member 43 which has a flange 44 for engaging a rubber washer 45 surrounding the outlet 40. Interposed between the flange 44 and the packing cup 30 of the piston is a spring 46 which is employed to retract the piston and to also hold flange 44 in tight engagement with the rubber washer. When pressure is developed in cylinder 26 ahead of the piston by movement of the piston, it can flow out through openings 47 in the cup-shaped member by collapsing a portion of the rubber element 42. When the piston is allowed to be retracted, fluid can flow back into the cylinder by pushing flange 44 of the cup off the washer and against the action of spring 46. Since spring 46 must be compressed before fluid can flow back into the cylinder, it is seen that the fluid in the conduits will remain under pressure when the piston reaches its retracted position.

In surrounding relation to the cup-shaped member 43 of valve mechanism 41 is a supporting member 48 having a flange 49 which is interposed between the end of spring 46 and flange 44 of said valve mechanism. The inner end of the supporting member supports a small cup-shaped member 50 provided with a flanged end 51. A spring 52 interposed between this cup-shaped member and the head of the cup-shaped member of the valve mechanism holds member 50 in the supporting member with its flanged edge abutting said member. The end of the cup-shaped member 50 is in axial alignment with the opening 37 in packing cup 30 and spaced a predetermined distance away from the packing cup when the piston is retracted. The packing cup is provided with an annular ridge 53 surrounding its opening 37, said ridge being adapted to engage the end wall of the cup-shaped member 50 when the piston is moved forwardly a sufficient distance. When this ridge so engages the wall of the cup-shaped member, opening 37 through the packing cup will be closed. However, the piston will not be prevented from additional movement after the cup-shaped member is engaged because the cup-shaped member 50 can be moved along with the piston by the compressing of spring 52.

The valve mechanism V, shown in detail in Figure 3, comprises a casing 54 provided with communicating bores 55 and 56. Bore 55 is connected with conduit 12 leading from master cylinder B, and bore 56 is connected by a fitting 57 to communicate with conduit 13 leading to the fluid motors of the brakes. Between bore 56 and conduit 13 is a check valve mechanism 58 which permits fluid to flow from the bore to the conduit but not in the opposite direction. Within bore 55 is a plunger 59 having one end extending into bore 56 and carrying a valve element 60. This valve element cooperates with a valve seat 61 and is normally biased on said seat by a spring 62. The other end of the plunger 59 extends into a cylinder 63 of larger diameter than bore 55, said cylinder being formed in a cap 64 threaded onto the end of casing 54. This other end of plunger 59 is enlarged to form a piston 65 slidable in cylinder 63. Suitable packing cups 66 and 67 prevent interchange of fluid between bore 55 and cylinder 63. The cylinder 63 is in constant communication by an inlet passage 68 with the branch conduit 14 which is connected to conduit 7 leading from the master cylinder A, said passage 68 being quite small in order to restrict rapid inflow of fluid.

Referring now to the operation of the braking system, all the parts will be in the positions shown in Figures 1, 2 and 3 when the system is inoperative. When it is desired to apply the service brakes 11, the brake pedal will be operated. This will cause operation of piston 4 of master cylinder A and piston 27 of master cylinder B. As soon as these pistons have moved sufficiently to cut off the compensating ports associated therewith, the pistons will begin to develop fluid under pressure. The fluid pressure developed by the master cylinder B will flow out into conduit 12 and branch conduit 15. This fluid pressure will be effective in bore 55 of valve B but will not cause unseating of valve element 60 due to the fact that there is a greater area on plunger 59 which is acted upon by the fluid pressure to hold the valve closed than the area which is acted upon to unseat the valve. The fluid pressure which enters the fluid motor 16 for actuating the emergency or parking brake will be effective in overcoming the retracting spring 25 and bringing the brake band into engagement with the drum.

When the master cylinder A begins to develop pressure, it will be effective in fluid motors 10 of brakes 11 and also in cylinder 63. As soon as the pressure in cylinder 63 is great enough to move plunger 59 to the right, the valve element 60 will be unseated, thus permitting fluid under pressure developed by the master cylinder B to also flow to the motors 10 by way of conduit 13. Since both master cylinders are now connected to motors 10, they will be effective in making a rapid displacement of fluid, thus bringing the brake shoes of the brakes into engagement with the drum. When the brake shoes of brakes 11 are in engagement with the drum, fluid pressure in the system will build up rapidly. When the fluid pressure in cylinder 26 of master cylinder B reaches a predetermined value, as determined by spring 39 acting on valve element 38, said valve element will be unseated and relieve any additional pressure tending to be developed by piston 27. Just prior to the development of such pressure by piston 27 as to open valve 38, the fluid motor 16 will have been so operated as to just bring the brake band 20 into engagement with drum 18. Thus the emergency brake will be ready to produce a braking action but no substantial braking will occur due to the fact that additional pressure cannot be created by the piston of master cylinder B. After the predetermined pressure is reached which causes valve 58 to be unseated, the piston of cylinder B no longer becomes effective in displacing fluid under pressure to fluid motors 10 notwithstanding continued movement of pedal 1. As the pedal continues to be moved, master cylinder A continues to develop pressure and brakes 11 are then solely actuated by this additional pressure. The additional fluid pressure which will now be effective in motors 10 cannot be forced into the master cylinder B because of the check valve mechanism 58.

From the foregoing it is seen that when pedal 1 is initially actuated both master cylinders A and B are effective in displacing fluid into motors 10 of the service brakes 11. Because of this large volume of fluid, the brake shoes will be engaged with their drum by a much shorter pedal travel than would be the case if only one master cylinder were employed. Upon the occurrence of a predetermined pressure, master cylinder B will no longer be effective in producing brake applying pressure and the additional pressure required will be solely developed by the master cylinder A. Because of the fact that the piston for the master cylinder A need only do half of the displacing to get the brake shoes of the brakes 11 into engagement with the drum, this piston can be made smaller than if it alone were employed to do all of the fluid displacing. Thus with this smaller piston it is possible to use less force on the brake pedal to do the developing of fluid pressure for actual braking purposes. The master cylinder B not only displaces fluid to assist in bringing the brake shoes of the brakes 11 into engagement with the drum but also displaces fluid to bring the brake band of the emergency brake into engagement with its drum. Thus this emergency brake is ready for brake application which, of course, is not possible by the master cylinder B as long as the valve element 38 can be opened to relieve pressure in cylinder 26. Because of the restricted passage 68 leading to cylinder 63 of valve V, a sudden application of master cylinder A will not cause immediate movement of plunger 59 and opening of valve 60. With valve 60 still closed, master cylinder B will build up its predetermined pressure without excessive movement of piston 27. If valve 60 should be opened quickly, piston 27 may displace too much fluid to motors 10 and be so moved that passage 37 will be closed before valve 38 is opened as explained later.

In the event there should be a total or partial failure of the service brakes 11, due to the fact that they may not be properly adjusted or leakage has occurred in some of the conduits or one of the conduits has become broken, the emergency brake will then be actuated by the master cylinder B to provide a braking of the vehicle. Breaking of the line, for example, will result in pedal 1 being moved rapidly toward fully depressed position. When this occurs, piston 27 of master cylinder B will now be moved sufficiently to cause ridge 53 surrounding the opening of packing cup 30 to engage the wall of the cup-shaped member 50. Passage 37 will then be closed off and the piston can begin to develop a higher fluid pressure than that determined by spring 39. This additional fluid pressure being developed can thus pass into the fluid motor 16 and cause piston 22 to apply the brake band 20 so that a braking action is produced on the propeller shaft 19. None of the fluid pressure being developed by master cylinder B, after the piston has moved so that passage 37 will be closed by the engagement of the ridge with the cup-shaped member 50, will be able to pass into the motors of the service brakes 11 because there is insufficient pressure being developed by master cylinder A to move plunger 59 and unseat the valve element 60. Thus it is seen that by means of the braking system described provision is made for actuating the emergency brake in the event there should be a failure of the service brakes. The emergency brake will always be so conditioned that no slack will have to be taken up whenever it is used as an emergency brake.

When the brake pedal is released, the pistons in the two master cylinders will be returned to their inoperative positions. All the fluid from wheel cylinders 10 will return to the master cylinder A since the presence of the check valve mechanism 58 will prevent the return to the master cylinder B. Fluid, however, returning to master cylinder A will enter its reservoir 2 and the excess will flow back through conduit 33 to reservoir 32 of master cylinder B. During the retracting movement of the pistons of the master cylinders, fluid can flow from the rear of the pistons to the forward side thereof by the collapsing of the piston packing cups in a well-known manner.

Figure 4:
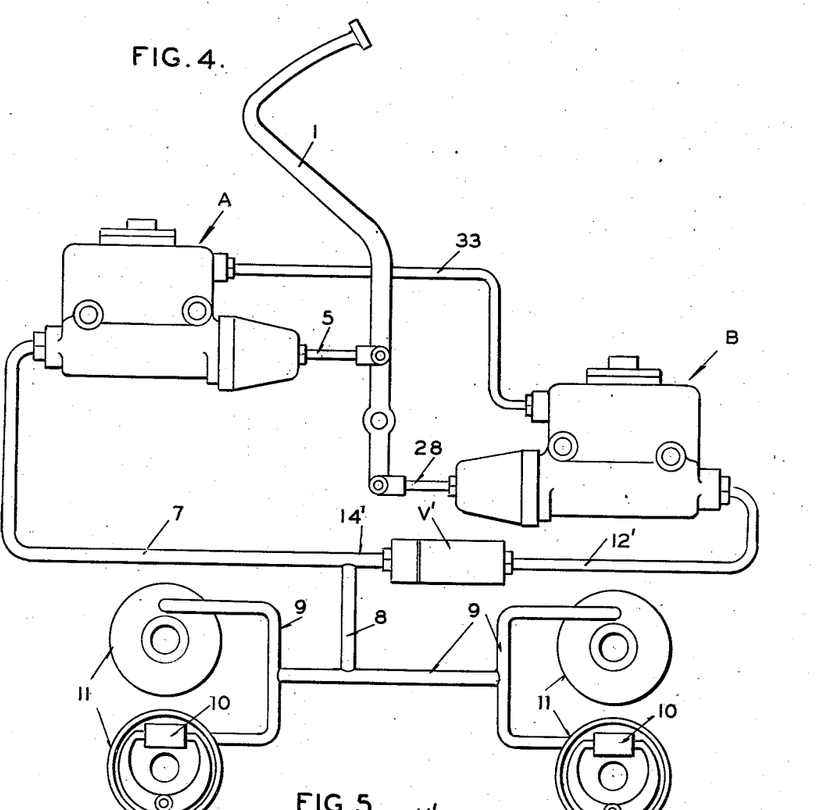
Figure 4 is a schematic view of a braking system similar to that shown in Figure 1 but with the emergency brake actuating portion eliminated.
Figure 5:
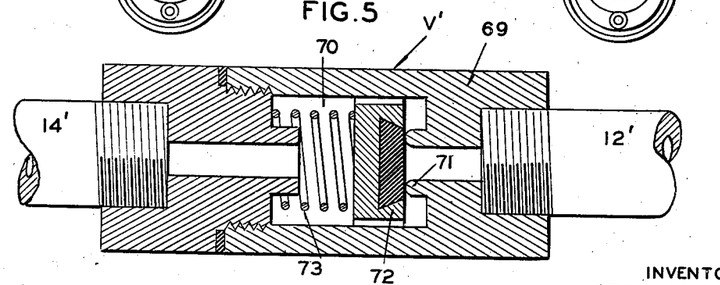
Figure 5 is a sectional view of the valve mechanism used in the system of Figure 4.

In Figure 4 there is shown a braking system similar to that of Figure 1 except that there are no connections from master cylinder B to an emergency brake. The control valve V is also simplified as no structure is required to prevent communication between the master cylinder B and the motors of brakes 11 in the event of any failure of the service brakes. Similar parts of the system are indicated by the same reference numerals as employed in Figure 1. The valve V', which replaces valve V, is in the form of a check valve mechanism and comprises a casing 69 having a central chamber 70. One end of the casing communicates with conduit 12' leading from master cylinder B and the other end communicates with branch conduit 14' leading from conduit 7 connected to the outlet of master cylinder A. The end of chamber 70 which communicates with master cylinder B is provided with a valve seat 71 and cooperating therewith is a check valve element 72 biased onto the seat by a spring 73. Thus fluid under pressure is free to flow from the master cylinder B to the fluid motors of brakes 11 but return flow is prevented.

In operation when the brake pedal 1 is initially actuated, both master cylinders will be operated to displace fluid to actuate fluid motors 10 so that the brake shoes will be engaged with the drum. Check valve element 72 will be unseated since there will be a slightly greater pressure developed by the master cylinder B than by the master cylinder A due to the fact that the master cylinder A diffuses its developed fluid into a greater volume of the system. When the brake shoes are brought into engagement with the drum and the pressure being developed in the fluid motor becomes a predetermined value, valve element 38 of master cylinder B will be opened and thereby relieve any additional pressure being developed in master cylinder B. Continued movement of the brake pedal will thus cause the brakes to be applied by the fluid pressure developed solely by master cylinder A. The higher fluid pressure being developed by master cylinder A will act on valve element 72 of the one-way valve mechanism and hold it seated.

In the system shown in Figure 4 when the brake shoes become so worn that it is necessary to move the brake pedal 1 such a distance to bring the brake shoes into engagement with the drum that piston 27 of master cylinder B will be so moved that ridge 53 will engage the cup-shaped member 50, then master cylinder B will also be effective in not only displacing fluid to place the brake shoes into engagement with the drum but also for applying a braking pressure to the brakes. Under these conditions fluid pressure cannot be relieved from the cylinder of master cylinder B and thus both master cylinders A and B become effective in displacing fluid pressure for braking purposes. It is thus seen that this system has advantages over one in which two master cylinders are employed solely to initially displace fluid to bring the brake shoes only into engagement with the drum. It also establishes a reserve master cylinder for applying the brakes whenever the brake shoes become badly worn.

Figure 6:
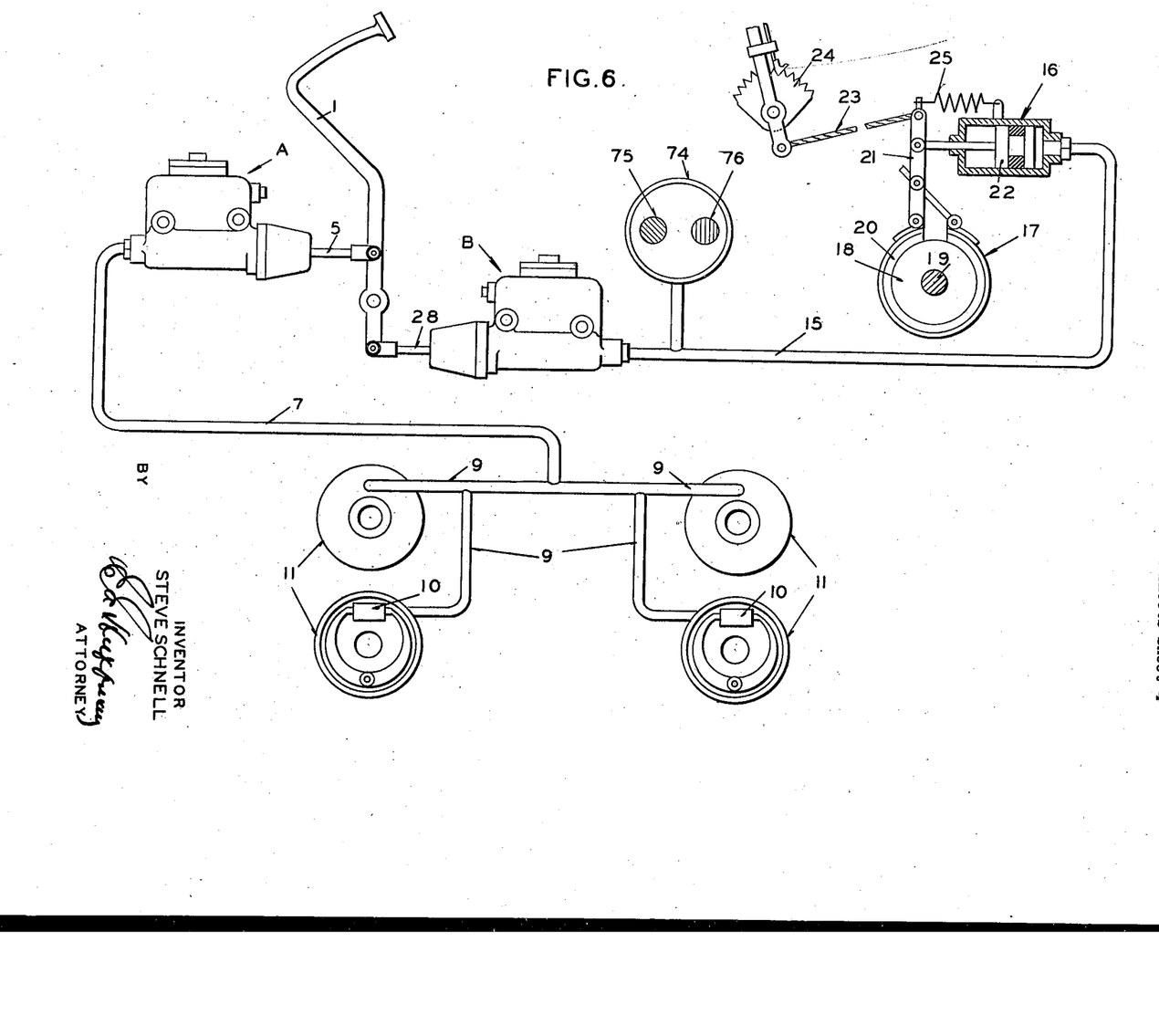
Figure 6 is a schematic view of still another braking system embodying two master cylinders.

In Figure 6 there is shown a braking system in which master cylinder B is employed only in preparing the emergency brake for application and applying it in the event of total or partial failure of the service brakes. The brake pedal 1 is connected to the master cylinders A and B in the same manner as in the prior described systems. The master cylinder A communicates with motors 10 of the service brakes 11 by means of conduit 7 and the various branch conduits 9. The master cylinder B has no connection whatsoever with motors 10. Its outlet is connected to the conduit 15 leading to fluid motor 16 for actuating the emergency brake 17, all the parts of which are designated by the same reference characters employed in the previously described structure of Figure 1. Associated with conduit 15 is a pressure indicating device 74 in which there are two lights 75 and 76, light 75 being green and light 76 being red. Since the master cylinders are not connected to a common-actuated device, the reservoirs thereof need not be interconnected.

When the brake pedal 1 is actuated, master cylinder A will be operated and act as the sole means to displace fluid to bring the brake shoes of brakes 11 into engagement with the drum and to apply force to said brake shoes for braking purposes. As master cylinder B is operated and develops pressure, the fluid motor 16 will be so actuated that it will bring the brake band of the emergency brake into engagement with the drum just prior to sufficient pressure being developed to cause valve element 38 to open and prevent any such high pressures from being developed that the emergency brake will be applied for braking purposes. This pressure is sufficient to so operate the indicating device that the green light 75 will be lighted. The operator will know by this green light that the service brakes are functioning properly and that the emergency brake has been so actuated as to bring its band into engagement with the drum. In the event there should be total or partial failure of the service braking system, then pedal 1 will move the piston of master cylinder B to such an extent that passage 37 through the packing cup will be closed by the engagement of ridge 53 with the wall of the cup-shaped member 50. Master cylinder B will now be capable of developing additional pressure and cause the emergency brake to be applied for braking purposes. This additional pressure being developed will also affect the indicating device by causing the red light 76 to come on. This light will warn the operator that his service brakes are not functioning properly and that the emergency brake is being used for braking purposes. The service brakes should then be given attention and the defect corrected.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure brake actuating system for a vehicle provided with service brakes and an emergency brake, two fluid pressure developing devices each having a movable pressure developing member, means for moving the members simultaneously, means for so connecting said devices to the service brake and the emergency brake that fluid pressure initially developed by both devices will be effective in causing the service brakes to be initially applied and the fluid pressure initially developed by one device only will also be effective in causing the emergency brake to be initially applied, means for preventing the last named device from developing a fluid pressure greater than a predetermined value as its movable member is moved through a portion of its protractile stroke simultaneously with the movable member of the other device, and means for causing the said last named device to develop fluid pressures higher than the predetermined pressures to thereby apply additional force to the emergency brake only as its member is moved beyond said portion of its protractile stroke.

2. In a fluid pressure brake actuating system for a vehicle provided with service brakes and an emergency brake, two fluid pressure developing devices each having a movable pressure developing member, means for moving the members simultaneously, means for connecting one device so that the pressure developed thereby will be effective to actuate only the service brakes, means for connecting the other device so that the pressure developed thereby will be effective to actuate the service brakes and the emergency brake, means for causing the last named device to develop only a predetermined pressure and maintain said pressure when its pressure developing member is moved through a portion of its protractile stroke, and means for causing said last named device to develop greater pressures when it is moved beyond said portion of its stroke.

3. In a fluid pressure brake actuating system for a vehicle provided with service brakes and an emergency brake, two fluid pressure developing devices each having a movable pressure developing member, means for moving the members simultaneously, means for connecting one device so that the pressure developed thereby will be effective to actuate only the service brakes, means for connecting the other device so that the pressure developed thereby will be effective to actuate the service brakes and the emergency brake, means for causing the last named device to develop only a predetermined pressure and maintain said pressure when its pressure developing member is moved through a portion of its protractile stroke, means for causing said last named device to develop greater pressures when it is moved beyond said portion of its stroke, and means for preventing said greater pressures, if developed, from being effective in actuating the service brakes.

4. In a fluid pressure brake actuating system for a vehicle, two master cylinders each provided with a pressure producing piston, means comprising a manually-operated member for simultaneously actuating both pistons, service brakes for the vehicle, an emergency brake, conduit means connecting both master cylinders to the service brakes, conduit means connecting one of the master cylinders to the emergency brake, means operative when both master cylinders are actuated for relieving the fluid pressure developed by the last named master cylinder after the pressure developed by its piston reaches a predetermined value, said predetermined pressure being sufficient to place the friction element of the emergency brake in braking position but not sufficient to establish any substantial braking action, and means for causing the piston of said master cylinder which is connected to the emergency brake to develop a higher pressure than said predetermined pressure to thereby apply said emergency brake but only after said piston has been moved beyond a predetermined point of its protractile stroke.

5. In a fluid pressure brake actuating system for a vehicle, two master cylinders each provided with a pressure producing piston, means comprising a manually-operated member for simultaneously actuating both pistons, service brakes for the vehicle, an emergency brake, conduit means connecting both master cylinders to the service brakes, conduit means connecting one of the master cylinders to the emergency brake, means operative when both master cylinders are actuated for relieving the fluid pressure developed by the last named master cylinder after the pressure developed by its piston reaches a predetermined value, said predetermined pressure being sufficient to place the friction element of the emergency brake in braking position but not sufficient to establish any substantial braking action, means for confining the fluid pressure developed by the other master cylinder to apply the service brakes only, and means for causing the piston of said master cylinder which is connected to the emergency brake to develop a higher pressure than said predetermined pressure to thereby apply said emergency brake but only after said piston has been moved beyond a predetermined point of its protractile stroke.

6. In a fluid pressure actuating system for applying the service brakes and an emergency brake on a vehicle, fluid motors for actuating the brakes, first and second master cylinders each provided with a pressure producing piston, conduit means for placing the first master cylinder in communication with the service brake fluid motors, other conduit means for placing the second master cylinder in communication with the service brake fluid motors and with the emergency brake fluid motor, valve means for preventing flow of fluid from the second master cylinder to the fluid motors of the service brakes unless fluid pressure is developed by the first named master cylinder, means operative as the pistons are actuated for relieving any pressure above a predetermined value which is developed by the piston of the second named master cylinder, and means for causing said second named master cylinder to develop higher fluid pressures than the predetermined pressures after the piston thereof has been moved a predetermined distance of its protractile stroke.

7. In a fluid pressure actuating system for applying brakes, fluid motors for actuating the brakes, two master cylinders each provided with a pressure producing piston, conduit means for placing said master cylinders in communication with the fluid motors, means for actuating the pistons simultaneously, means operative as the pistons are actuated for relieving any pressure above a predetermined value which is developed by one piston, and means for disabling said relieving means after said piston passes a predetermined point of its protractile stroke to thereby permit the piston to develop higher pressures than said predetermined pressure.

8. In a fluid pressure actuating system for applying brakes, fluid motors for actuating the brakes, two master cylinders each provided with a pressure producing piston, conduit means for placing said master cylinders in communication with the fluid motors, a manual member for actuating the pistons simultaneously, means operative as the pistons are actuated for relieving any pressure above a predetermined value which is developed by one piston, means for causing the fluid pressure being developed by the other piston to act only in the fluid motors when the pressure relieving means is operative, and means for disabling said relieving means after said one piston passes a predetermined point of its protractile stroke to thereby permit the piston to develop higher pressures than said predetermined pressure.

9. In a fluid pressure actuating system for applying brakes, fluid motors for actuating the brakes, first and second master cylinders each provided with a pressure producing piston, conduit means for placing the first master cylinder in communication with the fluid motors, other conduit means for placing the second master cylinder in communication with the fluid motors, valve means associated with the last named conduit means for preventing flow of fluid through said conduit means unless fluid pressure is developed by the first named master cylinder, means operative as the pistons are actuated for relieving any pressure above a predetermined value which is developed by the piston of the second named master cylinder, and means for preventing fluid pressure being developed by the first named master cylinder from being effective in the second named master cylinder.

10. In a fluid pressure actuating system for applying brakes, fluid motors for actuating the brakes, first and second master cylinders each provided with a pressure producing piston, conduit means for placing the first master cylinder in communication with the fluid motors, other conduit means for placing the second master cylinder in communication with the fluid motors, valve means associated with the last named conduit means for preventing flow of fluid through said conduit means unless fluid pressure is developed by the first named master cylinder, and means operative as the pistons are actuated for relieving any pressure above a predetermined value which is developed by the piston of the second named master cylinder.

11. In a fluid pressure brake actuating system for a vehicle provided with service brakes and an emergency brake, two fluid pressure developing devices each having a movable pressure developing member, means for moving the members simultaneously, means for connecting one of the devices to actuate the service brakes, means for connecting the other device to actuate the emergency brake, means associated with said other device for preventing its movable member from developing pressure above a predetermined value as said member is moved through the major portion of its protractile stroke, and means for disabling said last named means and permitting said member to develop higher fluid pressures when said member is moved beyond said portion of its protractile stroke.

12. In a fluid pressure brake actuating system for a vehicle provided with service brakes and an emergency brake, two fluid pressure developing devices each having a movable pressure developing member, means for moving the members simultaneously, means for connecting one of the devices to actuate the service brakes, means connecting the other device to actuate the emergency brake, means associated with said other device for preventing its movable member from developing pressure above a predetermined value as said member is moved through the major portion of its protractile stroke, means for disabling said last named means and permitting said member to develop higher fluid pressures when said member is moved beyond said portion of its protractile stroke, and means for indicating whether the said other device is developing the predetermined pressure or a higher pressure.

13. In a fluid pressure brake actuating system for a vehicle provided with service brakes and an emergency brake, two fluid pressure developing devices each having a movable pressure developing member, means for moving the members simultaneously, means for connecting one of the devices to actuate the service brakes, means for connecting the other device to actuate the emergency brake, a pressure relief valve associated with the last named device for permitting its movable member to develop only a sufficient pressure during the major portion of its stroke as to cause the friction element of the emergency brake to be engaged with its drum but not produce any appreciable braking action, and means for disabling said pressure relieving means during the remaining portion of the protractile stroke of the pressure developing member to thereby cause said pressures to be developed that substantial braking action will be produced by the emergency brake.

14. In a fluid pressure actuating system for applying brakes, two master cylinders each provided with a pressure producing piston, a manual member connected to actuate both pistons simultaneously, means associated with one master cylinder for relieving the fluid pressure developed by its piston after the pressure reaches a predetermined value, and means for disabling said relieving means after said piston passes a predetermined point in its protractile stroke to thereby permit the piston to develop higher fluid pressures than said predetermined pressure.

15. In a fluid pressure actuating system for applying brakes, two master cylinders each provided with a pressure producing piston, a manual member connected to actuate both pistons simultaneously, a pressure relief valve associated with one master cylinder for maintaining the fluid pressure developed by its piston at a predetermined value, and means for preventing said relief valve from functioning after said piston passes a predetermined point in its protractile stroke to thereby permit the piston to develop higher fluid pressures than said predetermined pressure.

16. In a master cylinder device for use in a fluid pressure actuating system, said master cylinder device comprising a cylinder, a piston reciprocable therein, means for actuating the piston to develop pressure, means for preventing the piston from developing fluid pressure greater than a predetermined value as said piston is moved through a portion of the distance of its protractile stroke, and means for disabling said last named means during the remainder of the protractile stroke so that said piston can develop greater pressures than said predetermined pressure.

17. In a master cylinder device for use in a fluid pressure actuating system, said master cylinder device comprising a cylinder, a piston reciprocable therein, means for actuating the piston to develop pressure, means including a pressure-operated relief valve for preventing the piston from developing fluid pressure greater than a predetermined value as said piston is moved through a portion of the distance of its protractile stroke, and means for preventing the relief valve from functioning during the remainder of the protractile stroke so that said piston can develop greater pressures than said predetermined pressure.

18. In a master cylinder device for use in a fluid pressure actuating system, said master cylinder device comprising a cylinder, a piston reciprocable therein, means for actuating the piston to develop pressure, means permitting said piston to develop pressure up to a predetermined value when moved through a portion of its protractile stroke, means for causing the developed pressure to be maintained at the predetermined value during an additional portion of the protractile stroke, and means operative during the remaining portion of the protractile stroke for causing the piston to develop higher fluid pressures than said predetermined pressure.

19. In a master cylinder device for use in a fluid pressure actuating system, said master cylinder device comprising a cylinder, a piston reciprocable therein, a reservoir, means for actuating the piston, means for placing the cylinder ahead of the piston in communication with the reservoir and comprising a passage through the piston, relief valve means for said passage capable of being opened when the pressure developed by the piston is a predetermined value, and means for preventing fluid pressure from opening said relief valve during the latter portion of the protractile stroke of the piston.

20. In a master cylinder device for use in a fluid pressure actuating system, said master cylinder device comprising a cylinder, a piston reciprocable therein, a reservoir, means for actuating the piston, means for placing the cylinder ahead of the piston in communication with the reservoir and comprising a passage through the piston, relief valve means for said passage capable of being opened when the pressure developed by the piston is a predetermined value, and means comprising a yieldably mounted member carried by the cylinder and spaced a predetermined distance ahead of the piston when in its retracted position for maintaining the piston passage closed and preventing flow of fluid to the reservoir during the latter portion of the protractile stroke of the piston.

STEVE SCHNELL.